United States Patent [19]

Garrett et al.

[11] Patent Number: 4,867,416

[45] Date of Patent: Sep. 19, 1989

[54] PORTABLE HYDRAULIC LIFT FOR LARGE LAMPS AND THE LIKE

[75] Inventors: Philip D. Garrett, Burbank; Lance A. Snoke, Valencia, both of Calif.; James Bondly, Minot; James C. Borrud, West Williston, both of N. Dak.

[73] Assignee: American Studio Equipment, Sun Valley, Calif.

[21] Appl. No.: 179,404

[22] Filed: Apr. 8, 1988

[51] Int. Cl.[4] .............................................. B60P 1/00

[52] U.S. Cl. .................................. 254/2 R; 254/93 R

[58] Field of Search .......................... 414/11; 182/141; 254/89 H, 93 R, 2 R, 2 B, 2 C, 4 R, 4 B, 4 C, 425

[56] References Cited

U.S. PATENT DOCUMENTS

| | | | |
|---|---|---|---|
| 2,675,211 | 4/1954 | Regoard | 182/141 |
| 2,966,956 | 1/1961 | Campbell et al. | 182/141 |
| 3,149,822 | 9/1964 | Hadek | 254/425 |
| 3,854,699 | 12/1974 | Garnett | 254/93 R |
| 4,360,187 | 11/1982 | Chapman | 254/8 R |
| 4,378,098 | 3/1983 | Evans | 254/89 H |

FOREIGN PATENT DOCUMENTS

| | | | |
|---|---|---|---|
| 2227471 | 6/1972 | Fed. Rep. of Germany | 254/93 R |

*Primary Examiner*—Robert C. Watson

*Attorney, Agent, or Firm*—Kelly, Bauersfeld & Lowry

[57] ABSTRACT

A portable hydraulic lift is provided for supporting lamps and the like at selected vertical positions. The disclosed lift includes five concentrically positioned risers which slide with respect to one another. The lowermost first or base riser has a collapsible support structure for positioning the risers vertically, and the uppermost fifth riser has an attachment for lamps and the like. A hydraulic ram is positioned within the risers so that the ram piston is fixed with respect to the third riser, and the ram cylinder is fixed with respect to the fourth riser. Chain and sprocket assemblies are situated within the risers to cause equidistant relative movement of each inner riser with respect to its next adjacent outer riser, as the hydraulic ram is activated. Moreover, a fixed-length fluid pathway is provided for the hydraulic fluid from a reservoir situated within or adjacent to the base riser, to the hydraulic ram, as the risers move upwardly or downwardly.

25 Claims, 5 Drawing Sheets

FIG. 6
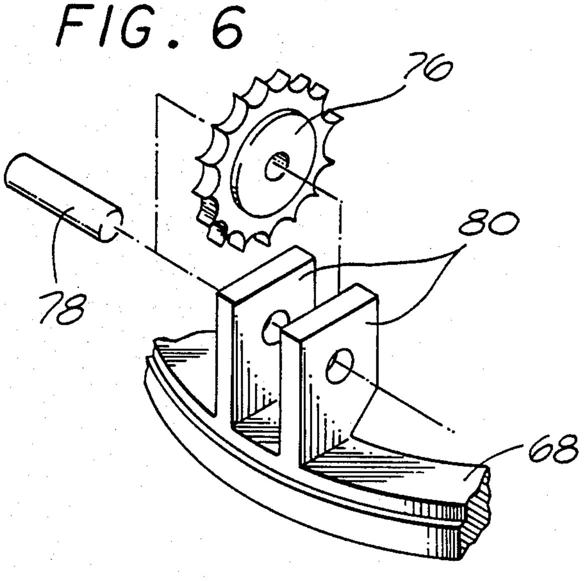
FIG. 7
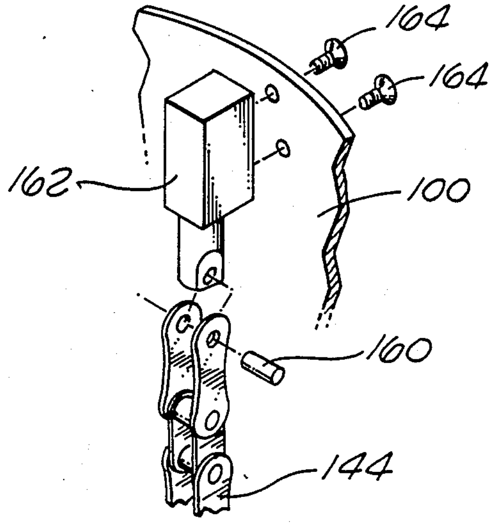
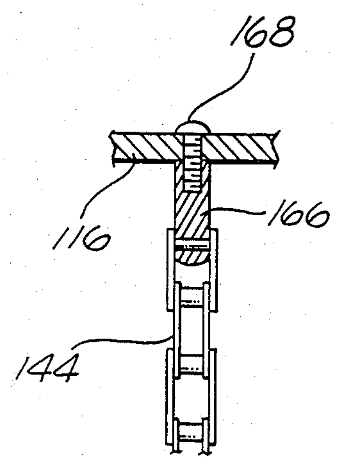
FIG. 8
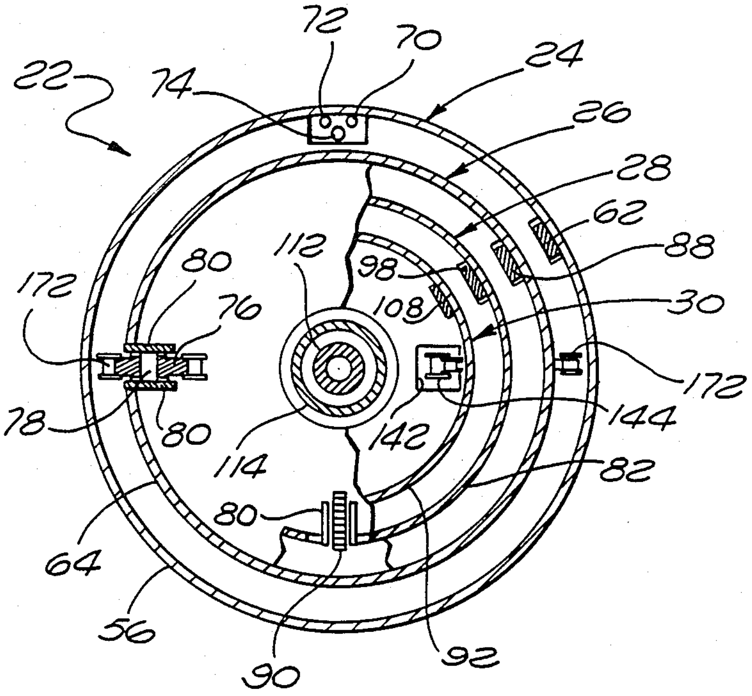
FIG. 5

PORTABLE HYDRAULIC LIFT FOR LARGE LAMPS AND THE LIKE

BACKGROUND OF THE INVENTION

This invention relates generally to lighting equipment for the motion picture, still picture and television industries. More particularly, this invention relates to devices for lifting large lamps, spotlights and the like, and supporting such fixtures at a desired height.

During the filming of motion pictures or television shows, many items of auxiliary specialized equipment are utilized by the producers and camera crews to obtain desired audio and visual effects. Such specialized equipment can include automobile mounts and accessories, dollies and track, scaffolding, camera mounting equipment, umbrellas, bags, scrims, butterflies, flags, reflectors, lamps, spotlights and stands.

To create a desired visual effect, a large lamp or spotlight must sometimes be positioned well above ground level. Such lamps are often too large or heavy to be adequately positioned on scaffolding by the camera crew, and thus it is usually desirable to provide a mechanical lift for the lamp. Mechanical lifts, in particular, can greatly hasten the set-up and position adjustment of lamps in a convenient manner.

In view of the foregoing, there has been a continuing need for mechanical lifts for large lamps and the like, which operate smoothly, quietly and reliably in hoisting large and heavy lamps to a desired height. A hydraulically actuated lift is preferred to provide the aforementioned characteristics, as well as to facilitate operator control. Additionally, a hydraulic lamp lift is needed which can be collapsed to an overall length of approximately four feet or less, and yet, when operational, can be extended fourteen feet or more. Further, an improved hydraulic lamp lift is needed which can be manufactured in various configurations having a variety of maximum height characteristics, without changing the core structure of the lift. Such a design maximizes manufacturing economies by minimizing the number of parts unique to a single model. Moreover, there exists a need for a hydraulic lamp lift which minimizes the volume of working fluid needed for operation, preferably through use of a single hydraulic ram, notwithstanding the number of extensible risers utilized in the lift. The present invention fulfills these needs and provides other related advantages.

SUMMARY OF THE INVENTION

The present invention resides in a portable hydraulic lift for supporting lamps and the like at selected vertical positions, which is reliable and capable of operating smoothly and quietly. The portable lift comprises, broadly, an extendable and retractable lamp support structure including at least four concentric risers which slide with respect to one another. The lowermost riser is provided means for supporting the lamp support structure in a stable vertical configuration over a generally horizontal surface. Further, means are provided for moving each inner riser equidistantly with respect to its next adjacent outer riser as a single hydraulic ram moves, which itself is directly attached to only two of the risers. To accomplish this, several mechanical attachment means comprising chain and sprocket assemblies are provided.

In a preferred form of the invention, the extendable and retractable lamp support structure includes at least five concentric risers which slide with respect to one another. These risers include a lowermost first riser, a second riser situated within the first riser and capable of extending upwardly therefrom, a third riser situated within the second riser and capable of extending upwardly therefrom, a fourth riser situated within the third riser and capable of extending upwardly therefrom, and a fifth riser situated within a fourth riser and capable of extending upwardly therefrom. The fifth riser includes means for mounting a lamp or the like on an upper end thereof, and each riser is provided key means for preventing rotational movement thereof with respect to each adjacent riser.

The means for supporting the lowermost first riser includes a plurality of downwardly extending legs which are pivotally attached adjacent an upper end of the first riser. Further, bracing means are provided for rigidly positioning the legs in an expanded and supporting configuration. This bracing means can be collapsed quickly and conveniently to place the legs adjacent to the first riser, for facilitating transport and handling of the portable lift.

The hydraulic ram includes a piston rigidly attached to the third riser, and a cylinder which is rigidly attached to the fourth riser. The hydraulic ram extends upwardly within the third, fourth and fifth risers. A hydraulic fluid reservoir and pump is situated adjacent to the lowermost first riser, and a pair of hydraulic fluid lines extend upwardly from the pump between the first and second risers to a needle valve. A flexible feed line extends from the valve downwardly between the first and second risers to a point at or near the lower end of the second riser, and then upwardly within the second riser to the hydraulic ram. This flexible feed line supplies hydraulic fluid to a channel within the piston of the hydraulic ram.

A first chain and sprocket assembly moves the fifth riser relative to the fourth riser in response to movement of the fourth riser relative to the third riser. Such movement of the fourth riser relative to the third riser is caused by and corresponds with movement of the hydraulic ram cylinder with respect to its piston. This first chain and sprocket assembly includes a sprocket rotatably attached to an upper end of the cylinder, and a chain attached to the fifth riser and to the third riser. When the chain is positioned to engage the cylinder sprocket, it causes the fifth riser to move relative to the fourth riser at the same rate as the hydraulic ram moves the fourth riser relative to the third riser.

A second chain and sprocket assembly is provided for moving the third riser relative to the second riser in response to movement of the fourth riser relative to the second riser. The second chain and sprocket assembly includes a pair of sprockets rotatably attached at a lower end of the third riser, and a corresponding pair of chains, each being attached to the fourth riser and to the second riser. These chains engage their respective sprockets to move the third riser relative to the second riser at the same rate the hydraulic ram moves the fourth riser relative to the third riser.

Similarly, a third chain and sprocket assembly moves the second riser relative to the first riser in response to movement of the third riser relative to the first riser. More specifically, the third chain and sprocket assembly includes a pair of sprockets rotatably attached at a lower end of the second riser, and a corresponding pair of chains, each being attached to the third riser and to the first riser. When these chains are arranged to engage their respective sprockets, they cause the second riser to move relative to the first riser at the same rate as the hydraulic ram moves the fourth riser relative to the third riser.

Consistent with the intent of providing a portable hydraulic lift, the hydraulic fluid within the reservoir can be pumped utilizing a motor when an appropriate power source is available, or alternatively with an auxiliary hand pump.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is a horizontal section taken generally along the line 5—5 of FIG. 3, illustrating, among other things, the use of keys to effectively prevent rotation of the risers with respect to one another;

FIG. 6 is an exploded perspective view of a portion of the rings/wipers situated at the lower end of the second and third risers, illustrating the manner in which a sprocket is rotatably attached thereto;

FIG. 7 is an exploded perspective view illustrating the preferred manner for attaching chains to the risers;

FIG. 8 is an elevational and partially sectional view illustrating the preferred manner of attaching chains to plates fixed to the hydraulic ram;

DETAILED DESCRIPTION OF THE PREFERRED EMBODIMENT

Figure 1:
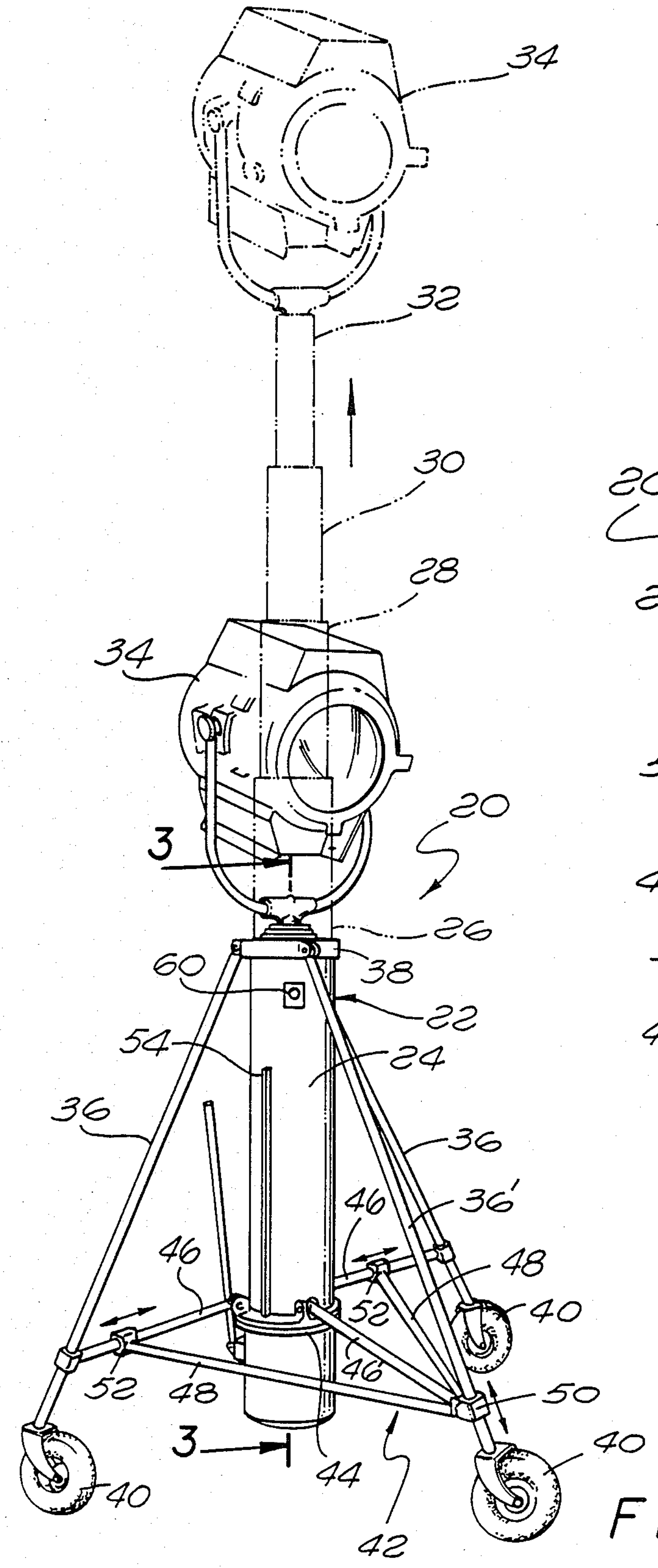
FIG. 1 is a perspective view of a preferred form of the portable hydraulic lift for supporting lamps and the like at selected vertical heights, illustrating a support structure comprising a plurality of legs for positioning a lowermost riser vertically, and also showing the manner in which a lamp or spotlight can be utilizing the portable lift.
Figure 2:
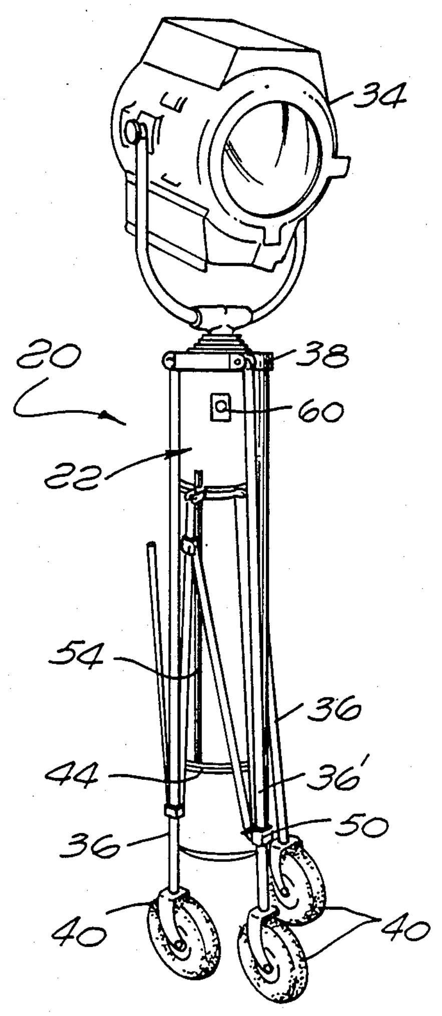
FIG. 2 is another perspective view similar to FIG. 1, illustrating the lamp support structure in its fully retracted position, and a leg support structure in its fully collapsed configuration

As shown in the drawings for purposes of illustration, the present invention is concerned with a portable hydraulic lift, generally designated in FIGS. 1 and 2 by the reference number 20. This improved lift 20 comprises, broadly, an extendable and retractable lamp support structure 22, including five concentric risers 24, 26, 28, 30 and 32, which can slide with respect to one another. The portable hydraulic lift 20 of the present invention is capable of supporting lamps and the like, such as the lamp 34, at selected vertical positions.

In accordance with the present invention, the lamp support structure 22 is oriented generally vertically by means of a plurality of downwardly extending legs 36 and 36,, which are each pivotally attached to an upper ring/wiper 38 of the lowermost riser 24. Attached to the lower end of each leg 36 and 36′ is a standard caster and wheel assembly 40, which permits the portable hydraulic lift 20 to be easily moved over a horizontal surface. A bracing structure 42 extends between the legs 36 and 36; and a sliding ring 44 which surrounds a lower portion of the first riser 24, to rigidly position the legs in an expanded and supporting configuration. This bracing structure 42 includes three bars 46 and 46′ which extend inwardly from a lower portion of each leg 36 and 36′ to the sliding ring 44. These bars 46 and 46′ are pivotable at their attachments to both the legs and the sliding ring. Auxiliary bars 48 are provided between two of the bars 46 and a slider 50 which attaches the central bar 46′ to its leg 36′.

The auxiliary bars 48 are attached to their respective bars 46 by auxiliary sliders 52, which permit and end of each auxiliary bar 48 to slide along the length of the respective bar 46. Similarly the slider 50, at which the center bar 46′ and each auxiliary bar 48 attaches to a central leg 36′, is capable of sliding the length of the central leg. An exterior key 54 is rigidly fixed to the exterior of the lower riser 24, and interacts with a groove provided the sliding ring 44 to prevent any rotation thereof with respect to the lower riser.

This arrangement of the legs 36 and 36′ and bracing structure 42 is capable of being collapsed as shown in FIG. 2 to place the legs adjacent to the lower riser 24, for facilitating transport and handling of the portable hydraulic lift 20. To accomplish this, the user would move the slider 50 upwardly on the central leg 36′, while simultaneously pulling the sliding ring 44 upwardly. At a point in its travel upwardly along the central leg 36′, as the remaining legs 36 begin to collapse upon the lower riser 24, the sliding ring 44 would naturally begin to move downwardly toward its original position. The specific construction of the leg support structure, the bracing structure, the sliding ring and the various sliders permits the legs to be collapsed as shown in FIG. 2 without any disassembly of parts.

Figure 3:
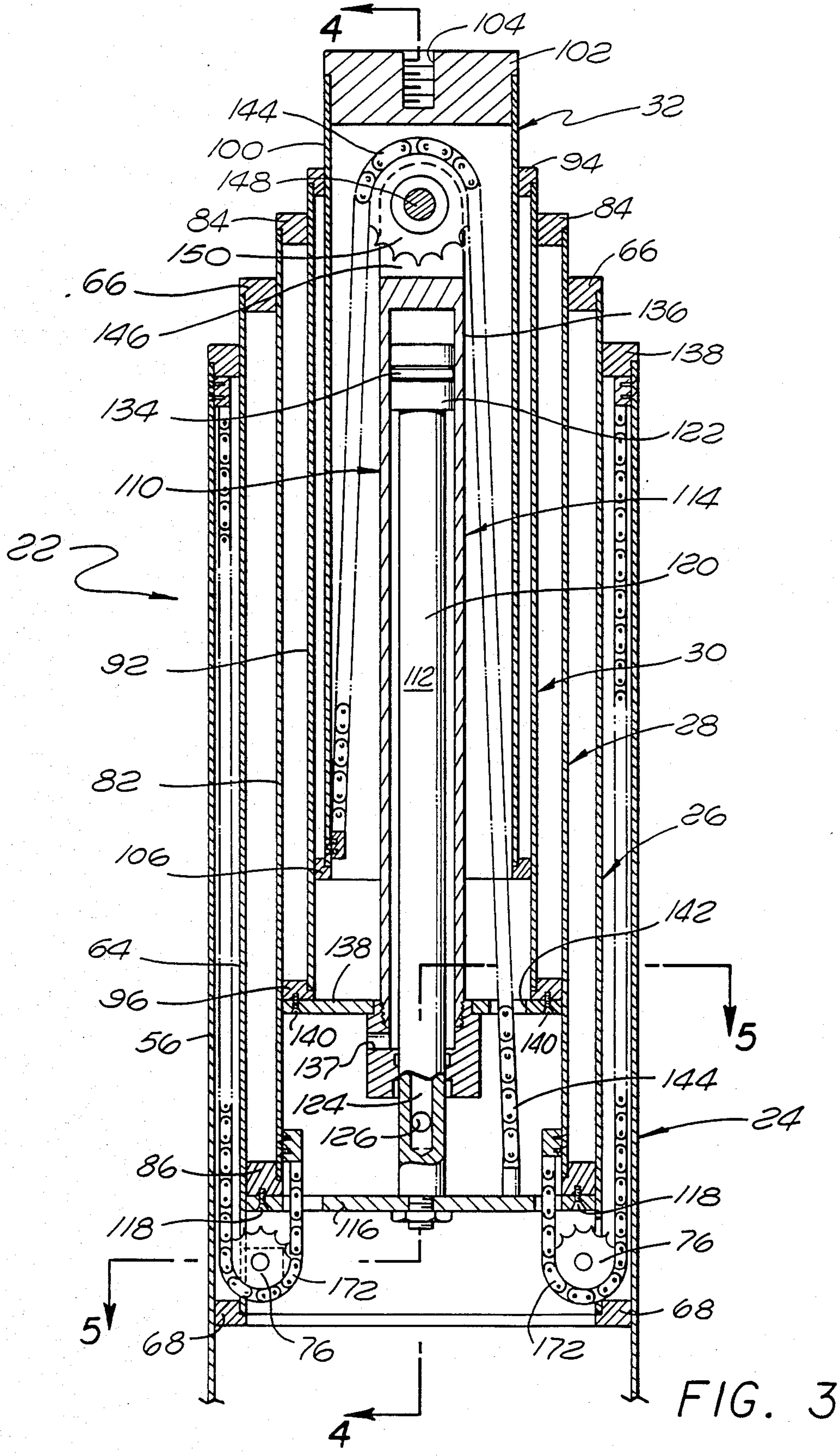
FIG. 3 is an enlarged elevational section taken generally along the line 3—3 of FIG. 1, illustrating, among other things, the relative positioning of five concentric risers forming an extendable and retractable lamp support structure, and associated apparatus for moving each inner riser equidistantly relative to its next adjacent outer riser.
Figure 4:
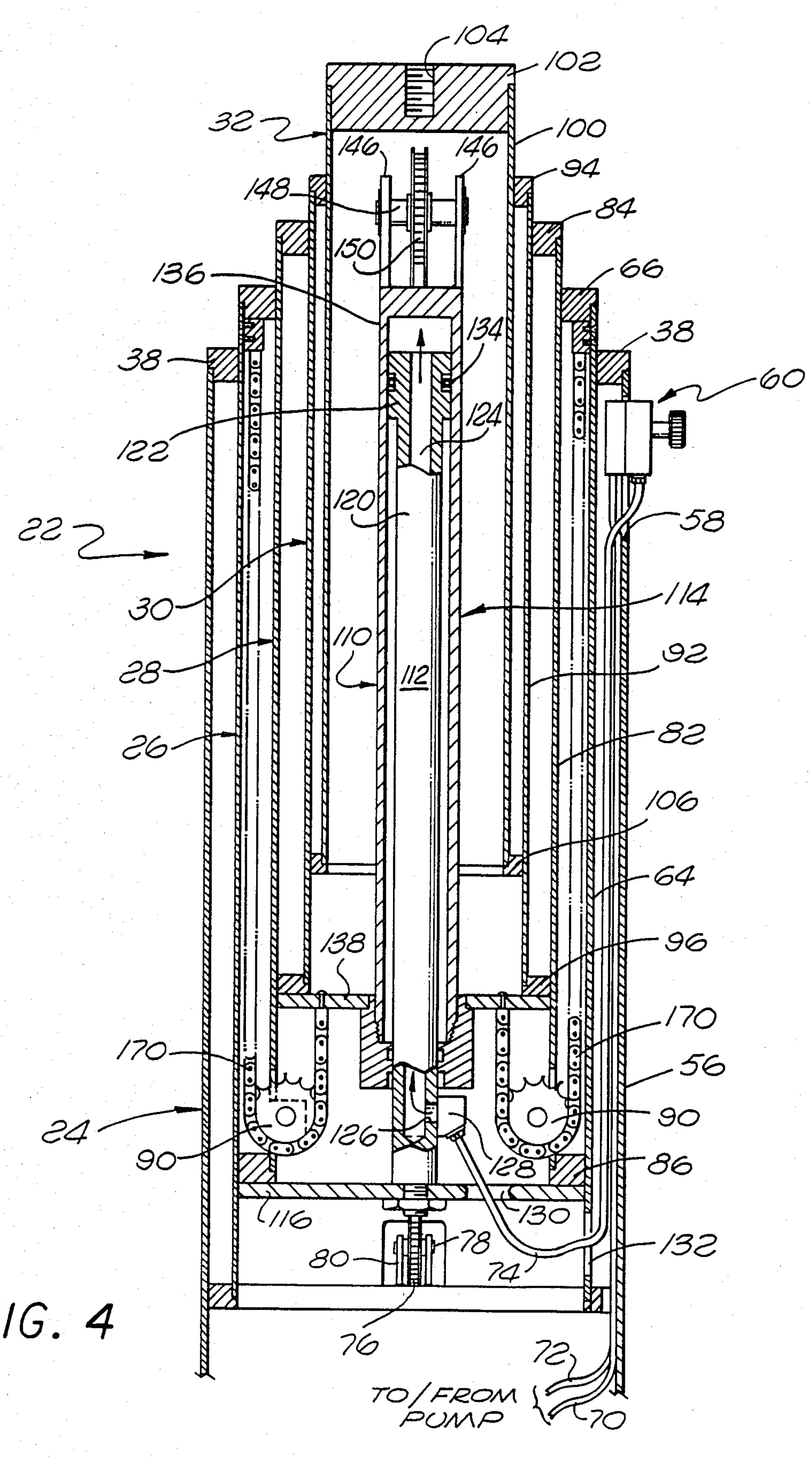
FIG. 4 is a vertical section taken generally along the line 4—4 of FIG. 3, further illustrating the operable apparatus for moving each inner riser equidistantly with respect to its next adjacent outer riser, and additionally showing the manner in which hydraulic fluid is channeled through the lamp support structure to a hydraulic ram.
Figure 9:
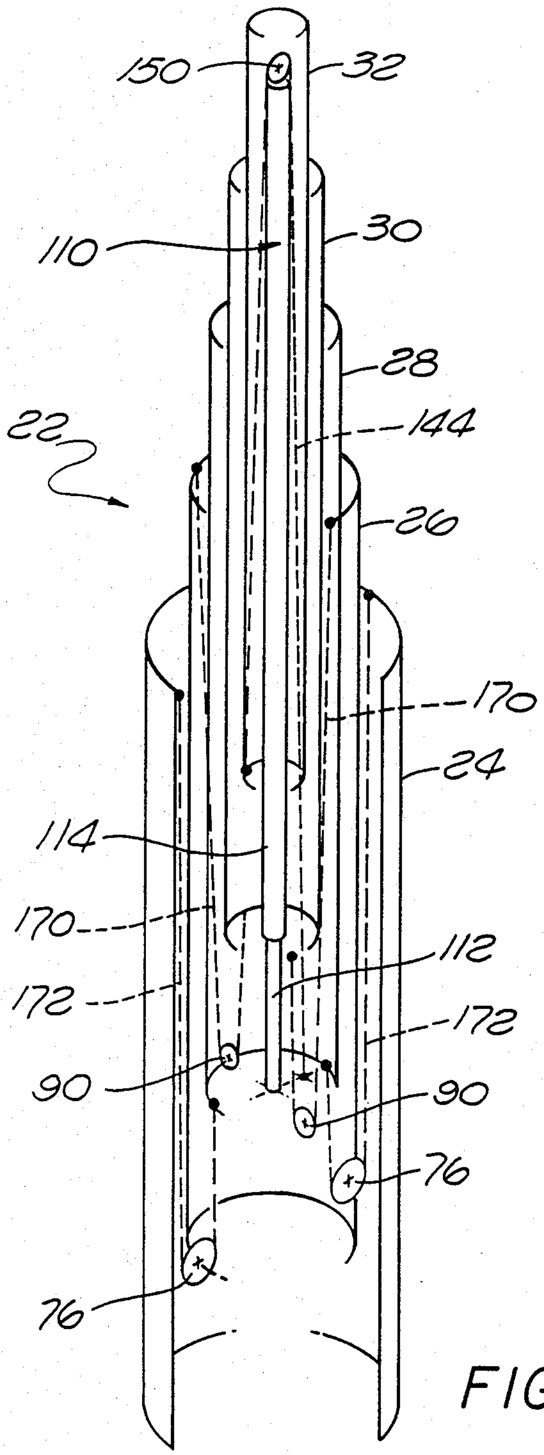
FIG. 9 is a schematic illustration of the operable portions of the portable hydraulic lift of the present invention, illustrating the relative positions of various sprockets and chains with respect to the concentric risers and the hydraulic ram.

With reference now to FIGS. 3, 4 and 5, the lamp support structure 22 will be described in detail. As mentioned previously, the lamp support structure 22 includes the five concentric risers 24, 26, 28, 30 and 32, which slide with respect to one another. The lowermost or first riser 24 comprises a first tube 56 having an aperture 58 situated near its upper end for providing access to a needle valve 60. The upper ring/wiper 38 of the lower riser 24 is fixed to the upper end of the first tube 56, and functions as a spacer for positioning the second riser 26 within the first tube 56. As illustrated in FIG. 5, a key 62 extends substantially the length of the first tube 56, for preventing rotation of the second riser 26 with respect to the first riser 24.

The second riser 26, like the first riser 24, includes a second tube 64 and a second upper ring/wiper 66 affixed to the top edge of the second tube 64. Additionally, the second riser 26 includes a lower ring/wiper 68 attached to the lower end of the second tube 64. This lower ring/wiper 68 acts to space the lower end of the second tube 64 from the first tube 56, and includes two channels (not shown) which create gaps between the lower ring/wiper 68 and the first tube 56. One of these gaps is positioned to correspond with the first key 62 affixed to the inner surface of the first tube 56. This arrangement effectively prevents the second tube 64 from rotating with respect to the first tube 56. The second gap is provided to permit hydraulic lines 70, 72 and 74 to pass between the first and second risers 24 and 26.

As illustrated best in FIGS. 3 and 6, the lower ring/wiper 68 further includes a pair of sprockets 76 which are rotatably mounted adjacent to the lower end of the second tube 64. These sprockets 76 are mounted to the lower ring/wiper 68 upon an axle 78 which is suspended from the lower ring/wiper 68 by a respective clevis 80 attached to the lower ring/wiper.

The third riser 28 is situated within the second riser 26 and is capable of extending upwardly therefrom. The third riser 28 comprises a third tube 82, an upper ring/wiper 84 affixed to the top end of the third tube, and a lower ring/wiper 86 fixed to the lower end of the third tube 82. The upper ring/wiper 84 functions to space the third tube 82 from the fourth riser 30, in the same fashion that the upper ring/wiper 66 of the second riser functions to space the second tube 64 from the third riser 28. The lower ring/wiper 86 includes a single groove (not shown) which interacts with a key 88 fixed to the inner surface of the second tube 64 (see FIG. 5), to prevent rotation of the third riser 28 with respect to the second riser 26.

As illustrated best in FIGS. 4 and 5, a pair of sprockets 90 are fixed within respective clevises 80 provided by the lower ring/wiper 86, in the same manner as described above in connection with the second riser 26. The sprockets 90 associated with the third riser 28 are spaced at 90 degree intervals from the sprockets 76 associated with the second riser 26.

The fourth riser 30 is situated within the third riser 28 and is capable of extending upwardly therefrom. The fourth riser 30 comprises a fourth tube 92, an upper ring/washer 94 which is affixed to the upper end of the fourth tube 92, and a lower ring/washer 96 fixed to a lower end of the fourth tube 92. Like the other upper rings/washers, the upper ring/washer 94 of the fourth riser 30 functions to space the fifth riser 32 from the forth tube 92. Similarly, the lower ring/washer 96 functions to space the lower end of the fourth tube 92 from the third tube 82. The lower ring/washer 96 also has a groove (not shown) therein which interacts with a key 98 fixed to the inner surface of the third tube 82, to prevent rotation of the fourth riser 30 relative to the third riser 28.

The uppermost or fifth riser 32 is concentrically situated within the fourth riser 30 and is capable of extending upwardly therefrom. The fifth riser 32 comprises a fifth tube 100, a cap 102 having a threaded aperture 104 therein for receiving the lamp 34, and a lower ring/washer 106 fixed to the lower end of the fifth tube 100. This lower ring/washer 106 also includes a groove (not shown) which interacts with a key 108 fixed to an inner surface of the fourth tube 92, to prevent rotation of the fifth riser 32 relative to the fourth riser 30.

A hydraulic ram apparatus 110 is positioned within the lamp support structure 22, and is attached to the third and fourth risers 28 and 30. The hydraulic ram apparatus 110 comprises a piston 112 and a cylinder 114 which is capable of moving upwardly with respect to the piston. The piston 112 is fixed to a lower plate 116, which in turn is fixed to the lower ring/wiper 86 of the third riser 28 by means of screws 118.

The piston 112 includes an elongated shaft 120 and a cylinder engaging head 122 situated at the upper end of the shaft 120. A fluid passageway 124 extends downwardly from the top end of the piston 112 to an inlet port 126 situated below the lower end of the cylinder 114. A connector 128 is provided for attaching the flexible hydraulic line 74 to the piston 112 at its inlet port 126. The flexible hydraulic line 74 extends from the piston inlet port 126 downwardly through an aperture 130 provided in the piston plate 116, through an aperture 132 provided through the lower end of the second tube 64, and then upwardly between the first and second tubes 56 and 64 to the needle valve 60. Further, the head portion 122 of the piston 112 is provided an annulus wherein an O-ring seal 134 is situated.

The cylinder 114 includes a tubular portion 136 which surrounds substantially the length of the piston 112. This tubular portion 136 includes an inner surface which engages the piston head 122 (and particularly the O-ring 134), to define a variable working volume between the top end of this tubular portion 136 and the piston head 112. As hydraulic fluid is pumped into the fluid passageway 124, the pressure of the hydraulic fluid tends to force the cylinder 114 upwardly. A vent 137 is further provided to accommodate air-flow between the piston shaft 120 and the cylinder beneath the piston head 122, as the piston 112 and the cylinder 114 move with respect to one another.

The cylinder 114 is fixed to a plate 138 at its lower end, which plate in turn is fixed to the lower ring/wiper 96 of the fourth riser 30 by means of appropriate bolts 140. The cylinder base plate 138 is provided an aperture 142, through which a first chain 144 extends. This first chain will be described in greater detail below.

Fixed to the upper end of the cylinder 114 are a pair of parallel, upwardly extending, clevis-forming flanges 146. These flanges 146 provide a mounting support for an axle 148 on which an upper sprocket 150 is rotatably positioned.

Figure 10:
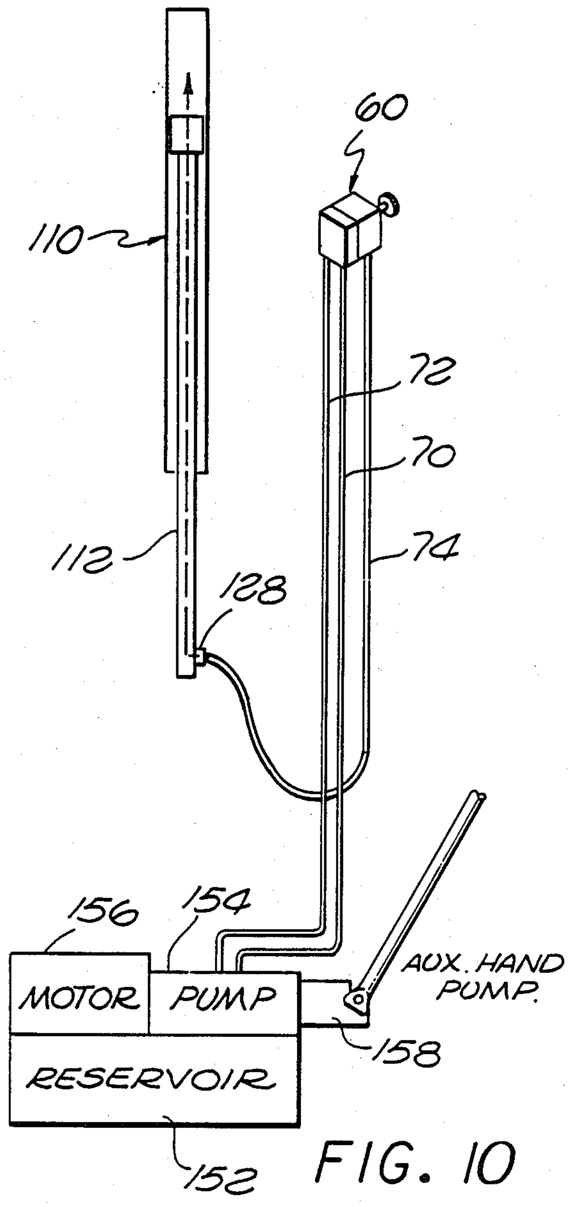
FIG. 10 is a schematic illustration of means for activating and controlling the hydraulic ram.

With reference now to FIGS. 4 and 10, it is to be understood that the hydraulic ram apparatus 110 functions in a manner very similar to standard hydraulic rams. In particular, as hydraulic fluid is pumped from a reservoir 152 by a pump 154 through the hydraulic feed line 70 to the needle valve 60, and from the needle valve through the flexible hydraulic line 74 to the inlet port 126 of the piston 112, the cylinder 114 will be forced upwardly with respect to the piston 112. By virtue of its rigid connection to the fourth riser 30, movement of the cylinder 114 relative to the piston 112 results in a corresponding movement of the fourth riser 30 relative to the third riser 28.

The needle valve 60 can be adjusted to close the flexible hydraulic fluid line 74 to fluid communication with both the feed line 70 and the return line 72. This has the effect of fixing the volume of fluid within the hydraulic ram apparatus 110, and thereby fix the position of the cylinder 114 with respect to the piston 112. The needle valve 60 can also be adjusted to open the flexible hydraulic line 74 to the return line 72, for purposes of permitting the hydraulic fluid to escape from the hydraulic ram apparatus 110, and thereby permit the cylinder 114 to move downwardly with respect to the piston 112. Due to the weight applied to the cylinder 114, the simple step of permitting hydraulic fluid to flow from the hydraulic ram apparatus 110 will tend to cause the cylinder 114 to move downwardly.

It is presently preferred that an electric pump motor 156 be situated within the lower riser 24 below the second riser 26, with the pump 154 and the reservoir 152. Further, it is preferred that the pump 154 include an attachment accessible through the lower end of the first tube 56 to permit use of an auxiliary hand pump 158 to pump hydraulic fluid from the reservoir 152 to the hydraulic ram apparatus 110.

The manner in which the hydraulic fluid lines 70, 72 and 74 are situated within the lamp support structure 22, creates a fixed-length fluid pathway and minimizes the chance that a fluid line will become damaged due to movement of the various risers with respect to one another. The feed and return lines 70 and 72 are preferably rigid copper or aluminum tubes which extend upwardly from the pump 154 to the needle valve 60, adjacent to the inner wall of the first tube 56. Through the provision of a groove in the lower ring/wiper 68 of the second riser 26, and various keys to prevent rotation of the tubes with respect to one another, the second riser 26 can move upwardly and downwardly with respect to the first riser 24 without ever engaging the two rigid fluid lines 70 and 72. Further, the positioning and configuration of the flexible hydraulic line 74, as shown in FIG. 4, insures that this flexible hydraulic line will always be pulled relatively taut as it moves through the aperture 132 provided through the second tube 64. It is important that the flexible hydraulic line 74 not be so taut that it cannot pass easily through the aperture 132.

With reference now to FIGS. 3 through 5, 7 and 8, the positioning and attachment of several drive chains will now be described. These chains, together with the sprockets described above, cause the equidistant relative movement of each inner tube with respect to its next adjacent outer tube as the hydraulic ram apparatus 110 is activated. More particularly, the first chain 144 is fixed at one end to a lower end of the fifth tube 100. As shown in FIG. 7, the first chain 144 is attached by a link axle 160 to an attachment block 162 which is designed to lie flush against the inner surface of the adjacent tube. This attachment block 162 is fixed to the lower end of the fifth tube 100 by means of two screws 164. The first chain 144 extends upwardly from this attachment block 162, over the upper sprocket 150, and then downwardly through the aperture 142 provided through the cylinder plate 138, and is attached at its other end to the piston plate 116. The attachment of the first chain 144 to the piston plate 116 is illustrated in greater detail in FIG. 8, where a second type of attachment block 166 is held to the plate by a bolt 168 extending therethrough.

As shown in FIG. 4, a pair of second chains 170 extend from an upper end of the second tube 64, around the respective sprockets 90, and are attached to the cylinder plate 138. The attachment of the second chains 170 to the upper end of the second tube 64 is similar to that illustrated in FIG. 7, and the attachment of the opposite end of the chains 170 to the cylinder plate 138 is similar to that illustrated in FIG. 8.

As illustrated in FIG. 3, a third set of chains 172 extend from an attachment of one end adjacent the upper end of the first tube 56, downwardly to engage the sprockets 76, and then upwardly to engage the lower end of the third tube 82. The attachment of both ends of the third chains 172 are similar to the attachment illustrated in FIG. 7.

To operate the portable hydraulic lift 20 of the present invention to raise the lamp 34 to a desired height, a user would first adjust the needle valve 60 so that hydraulic fluid pumped from the reservoir 152 upwardly through the fill line 70, would be returned to the reservoir via the return line 72. When ready to raise the lamp 34, the operator would turn the needle valve 60 to direct the hydraulic fluid from the feed line 70 to the flexible line 74, which feeds fluid into the hydraulic ram apparatus 110. This has the effect of causing the cylinder 114 to move upwardly with respect to the piston 112.

Due to the attachment of the cylinder to the fourth riser 30, and the attachment of the piston 112 to the third riser 28, a corresponding movement is produced between the third and fourth risers. This relative movement of the third and fourth risers also, through the arrangement of chains and sprockets, causes equidistant relative movement of the second riser 26 with respect to the first riser 24, the third riser 28 with respect to the second riser 26, and the fifth riser 32 with respect to the fourth riser 30. The relative movement of each of these aforementioned pairs of risers is equivalent to the relative movement of the cylinder 114 relative to the piston 112, and therefore the fourth riser 30 relative to the third riser 28.

More specifically, the first chain 144 is attached to the fifth riser 32 and to the piston plate 116, which is fixed to the third riser 28. Movement of the fourth riser 30, which supports the upper sprocket 150, relative to the third riser 28, causes the first chain 144 to pull the fifth riser 32 upwardly at the same rate as the cylinder 114 is moving with respect to the piston 112.

The second chains 170 function similarly to cause the third riser 28 to move at a similar rate with respect to the second riser 26. This is effected by attaching the ends of the second chains 170 to, respectively, the second riser 26 and the fourth riser 30 via the cylinder plate 138. The upward movement of the fourth riser 30 caused by the movement of the hydraulic ram apparatus 110, pulls the second chains 170 upwardly as they engage the sprockets 90, to pull the third riser 28 upwardly also.

Similarly, the third chains 172 are connected to the first riser 24 at one end, and the third riser 28 at another, and engage the sprockets 76 in a manner tending to pull the second riser 26 upwardly in response to the upward movement of the third riser 28.

When the lamp 34 has been positioned at a desired height, the needle valve 60 is once again turned to place the feed line 70 in communication with the return line 72, and close each of those lines to the flexible line 74. If desired, the pump motor 156 can then be turned off, and the lamp will be retained in its desired position.

Because much of the weight of the lamp 34 and the lamp support structure 22 bears downwardly on the hydraulic ram apparatus 110, lowering the lamp is simply a matter of releasing fluid from the flexible line 74 by repositioning the needle valve 60. Thus, it should be understood that the lamp 34 can be easily and conveniently raised and lowered by the portable hydraulic lift 20 simply by controlling the position of the needle valve and activation of the pump motor 156.

From the foregoing it is to be appreciated that the improved portable hydraulic lift 20 can be collapsed to an overall length of approximately four feet, and yet when operational can be extended fourteen feet or more. Further, it should be appreciated that the various components of the portable hydraulic lift 20 can be changed or reconfigured without affecting the operation or reliability thereof. For instance, in some applications it may be desirable to eliminate the first riser 24, and instead operate with only the remaining four risers. Moreover, the tubes need not necessarily be cylindrical, but can take on any other convenient shape, such as a tubular square. The design of the present invention maximizes manufacturing economies by minimizing parts unique to a single model.

Although a particular embodiment of the invention has been described in detail for purposes of illustration, various modifications may be made without departing from the spirit and scope of the invention. Accordingly, the invention is not to be limited, except as by the appended claims.

We claim:

1. A portable vertical riser mechanism, comprising:

a first riser;

a second riser concentrically positioned within the first riser and slidable with respect to the first riser, having at least one sprocket rotatably attached at a lower end thereof;

a third riser concentrically positioned within the second riser and slidable with respect to the second riser;

a fourth riser concentrically positioned within the third riser and slidable with respect to the third riser;

ram means situated within the fourth riser, including a first section attached to the second riser which is selectively movable with respect to a second section attached to the third riser, whereby movement of the second section relative to the first section results in a corresponding movement of the third riser relative to the second riser, the second ram section including a rotatable sprocket situated at its upper end;

first chain means attached to the fourth riser and to the second riser, the first chain means engaging the second ram section sprocket to move the fourth riser relative to the third riser at the same rate as the ram means moves the third riser relative to the second riser; and second chain means attached to the third riser and to the first riser, the second chain means engaging the at least one sprocket of the second riser to move the second riser relative to the first riser at the same rate as the ram means moves the third riser relative to the second riser.

2. A riser mechanism as set forth in claim 1, including a lowermost fifth riser concentrically surrounding the first riser, wherein the first riser is slidable with respect to the fifth riser and has at least one sprocket rotatably attached to a lower end thereof, and further including a third chain means attached to the second riser and to the fifth riser, the third chain means engaging the at least one sprocket of the first riser to move the first riser relative to the fifth riser at the same rate as the ram means moves the third riser relative to the second riser.

3. A riser mechanism as set forth in claim 2, including means for supporting the fifth riser in a stable vertical configuration over a generally horizontal surface, the fifth riser supporting means including a plurality of downwardly extending legs pivotally attached adjacent an upper end of the fifth riser, and bracing means for rigidly positioning the legs in an expanded and supporting configuration.

4. A riser mechanism as set forth in claim 1, including means for activating and controlling the ram means, wherein activation of the ram means moves the second section relative to the first section and causes each inner riser to move equidistantly relative to its next adjacent outer riser.

5. A riser mechanism as set forth in claim 4, wherein the hydraulic ram activating and controlling means includes a hydraulic fluid reservoir and pump situated adjacent to the first riser, a pair of hydraulic fluid lines extending upwardly from the pump to a valve means, and a flexible feed line extending from the valve means to the lower end of the first riser and then upwardly within the first riser to the ram means.

6. A portable hydraulic lift for supporting lamps and the like at selected vertical positions, the lift comprising:

an extendable and retractable lamp support structure including at least five concentric risers which slide with respect to one another, the risers including a lowermost first riser, a second riser situated within the first riser and capable of extending upwardly therefrom, a third riser situated within the second riser and capable of extending upwardly therefrom, a fourth riser situated within the third riser and capable of extending upwardly therefrom, and a fifth riser situated within the fourth riser and capable of extending upwardly therefrom, the fifth riser including means for mounting a lamp or the like on an upper end thereof;

means for supporting the first riser in a stable vertical configuration over a generally horizontal surface, the first riser supporting means including a plurality of downwardly extending legs pivotally attached adjacent to an upper end of the first riser, and bracing means for rigidly positioning the legs in an expanded and supporting configuration;

hydraulic ram means having a piston means rigidly attached to the third riser and a cylinder means rigidly attached to the fourth riser;

first chain and sprocket assembly means for moving the fifth riser relative to the fourth riser in response to movement of the fourth riser relative to the third riser, including a first sprocket rotatably attached to an upper end of the cylinder means, and first chain means attached to the fifth riser and to the third riser, wherein the first chain means engages the first sprocket to move the fifth riser relative to the fourth riser at the same rate as the hydraulic ram means moves the fourth riser relative to the third riser;

second chain and sprocket assembly means for moving the third riser relative to the second riser in response to movement of the fourth riser relative to the second riser;

third chain and sprocket assembly means for moving the second riser relative to the first riser in response to movement of the third riser relative to the first riser; and means for activating and controlling the hydraulic ram means, wherein activation of the hydraulic ram means to move the cylinder means relative to the piston means causes each inner riser to move equidistantly relative to its next adjacent outer riser.

7. A lift as set forth in claim 6, including key means for preventing rotational movement of the risers with respect to one another.

8. A lift as set forth in claim 6, wherein the supporting means includes means for collapsing the bracing means to place the legs adjacent to the first riser, to facilitate transport and handling of the lift.

9. A lift as set forth in claim 6, wherein the second chain and sprocket assembly means includes at least one sprocket rotatably fixed to the third riser, and second chain means attached to the fourth riser and to the second riser, the second chain means engaging the at least one sprocket of the third riser to move the third riser relative to the second riser at the same rate as the hydraulic ram means moves the fourth riser relative to the third riser.

10. A lift as set forth in claim 9, wherein the third chain and sprocket assembly means includes at least one sprocket rotatably fixed to the second riser, and third chain means attached to the third riser and to the first riser, the third chain means engaging the at least one sprocket of the second riser to move the second riser relative to the first riser at the same rate as the hydraulic ram means moves the fourth riser relative to the third riser.

11. A lift as set fort in claim 10, wherein the hydraulic ram activating and controlling means includes a hydraulic fluid reservoir and pump situated adjacent to the lowermost first riser, a pair of hydraulic fluid lines extending upwardly from the pump between the first and second risers to a valve means, and a flexible feed line extending from the valve means downwardly between the first and second risers to the lower end of the second riser, and then upwardly within the second riser to the hydraulic ram means.

12. A lift as set forth in claim 11, wherein the valve means comprises a needle valve, and wherein the flexible feed line supplies hydraulic fluid to a channel within the piston means.

13. A lamp lift, comprising:

an extendable and retractable lamp support structure including at least four concentric risers which slide with respect to one another, the risers including a first riser, a second riser situated within the first riser and capable of extending upwardly therefrom, a third riser situated within the second riser and capable of extending upwardly therefrom, and a fourth riser situated within the third riser and capable of extending upwardly therefrom;

means for supporting the lamp support structure in a stable vertical configuration over a generally horizontal surface; and means for moving each inner riser equidistantly with respect to its next adjacent outer riser, the moving means including a hydraulic ram for moving the third riser with respect to the second riser, first mechanical attachment means for moving the fourth riser with respect to the third riser, and second mechanical attachment means for moving the second riser with respect to the first riser, wherein the first mechanical attachment means includes a first sprocket rotatably attached to an upper end of the hydraulic ram, and a first chain means attached to the fourth riser and to the second riser, the first chain means engaging the first sprocket to move the fourth riser relative to the third riser at the same rate as the hydraulic ram moves the third riser relative to the second riser.

14. A lamp lift as set forth in claim 13, wherein the second mechanical attachment means includes a second sprocket rotatably attached to the second riser, and a second chain means attached to the third riser and to the first riser, the second chain means engaging the second sprocket to move the second riser relative to the first riser at the same rate as the hydraulic ram moves the third riser relative to the second riser.

15. A lamp lift as set forth in claim 13, wherein the hydraulic ram includes piston means rigidly attached to the second riser and cylinder means rigidly attached to the third riser, and further including means for activating and controlling the hydraulic ram, wherein activation of the hydraulic ram to move the cylinder means relative to the piston means causes each inner riser to move equidistantly relative to its next adjacent outer riser.

16. A lamp lift as set forth in claim 13, including a fifth riser concentrically surrounding the first riser, wherein the first riser is slidable with respect to the fifth riser and has at least one sprocket rotatably attached thereto, and further including a third mechanical attachment means for moving the first riser with respect to the fifth riser as the third riser moves with respect to the second riser.

17. A lamp lift as set forth in claim 16, wherein the third mechanical attachment means includes a third sprocket rotatably attached to the first riser, and a third chain means attached to the second riser and to the fifth riser, the third chain means engaging the third sprocket to move the first riser relative to the fifth riser at the same rate as the hydraulic ram moves the third riser relative to the second riser.

18. A lamp lift as set forth in claim 16, wherein the supporting means includes a plurality of downwardly extending legs pivotally attached adjacent to an upper end of the fifth riser, and bracing means for rigidly positioning the legs in an expanded and supporting configuration, and further including means for collapsing the bracing means to place the legs adjacent to the fifth riser to facilitate transport and handling of the lamp lift.

19. A lamp lift as set forth in claim 16, including a hydraulic fluid reservoir and pump situated adjacent to the fifth riser, a pair of hydraulic fluid lines extending upwardly from the pump between the fifth and first risers to a valve means, and a flexible feed line extending from the valve means downwardly between the fifth and first risers to a lower end of the first riser, and then upwardly within the first riser to the hydraulic ram.

20. A lamp lift, comprising:

an extendable and retractable lamp support structure including at least five concentric risers which slide with respect to one another, the risers including a first riser, a second riser situated within the first riser and capable of extending upwardly therefrom, a third riser situated within the second riser and capable of extending upwardly therefrom, a fourth riser situated within the third riser and capable of extending upwardly therefrom, and a fifth riser concentrically surrounding the first riser, wherein the first riser is slidable with respect to the fifth riser;

means for supporting the lamp support structure in a stable vertical configuration over a generally horizontal surface; and means for moving each inner riser equidistantly with respect to its next adjacent outer riser, the moving means including a hydraulic ram for moving the third riser with respect to the second riser, first mechanical attachment means for moving the fourth riser with respect to the third riser, and second mechanical attachment means for moving the second riser with respect to the first riser, and third mechanical attachment means for moving the first riser with respect to the fifth riser as the third riser moves with respect to the second riser.

21. A lamp lift as set forth in claim 20, wherein the second mechanical attachment means includes a second sprocket rotatably attached to the second riser, and a second chain means attached to the third riser and to the first riser, the second chain means engaging the second sprocket to move the second riser relative to the first riser at the same rate as the hydraulic ram moves the third riser relative to the second riser.

22. A lamp lift as set forth in claim 20, wherein the hydraulic ram includes piston means rigidly attached to the second riser and cylinder means rigidly attached to the third riser, and further including means for activating and controlling the hydraulic ram, wherein activation of the hydraulic ram to move the cylinder means relative to the piston means causes each inner riser to move equidistantly relative to its next adjacent outer riser.

23. A lamp lift as set forth in claim 21, wherein the third mechanical attachment means includes a third sprocket rotatably attached to the first riser, and a third chain means attached to the second riser and to the fifth riser, the third chain means engaging the third sprocket to move the first riser relative to the fifth riser at the same rate as the hydraulic ram moves the third riser relative to the second riser.

24. A lamp lift as set forth in claim 20, wherein the supporting means includes a plurality of downwardly extending legs pivotally attached adjacent to an upper end of the fifth riser, and bracing means for rigidly positioning the legs in an expanded and supporting configuration, and further including means for collapsing the bracing means to place the legs adjacent to the fifth riser to facilitate transport and handling of the lamp lift.

25. A lamp lift as set forth in claim 20, including a hydraulic fluid reservoir and pump situated adjacent to the fifth riser, a pair of hydraulic fluid lines extending upwardly from the pump between the fifth and first risers to a valve means, and a flexible feed line extending from the valve means downwardly between the fifth and first risers to a lower end of the first riser, and then upwardly within the first riser to the hydraulic ram.

* * * * *

UNITED STATES PATENT AND TRADEMARK OFFICE

CERTIFICATE OF CORRECTION

PATENT NO. : 4,867,416

DATED : September 19, 1989

INVENTOR(S) : Philip D. Garrett, Lance A. Snoke, James Bondly and James C. Borrud It is certified that error appears in the above-identified patent and that said Letters Patent is hereby corrected as shown below:

In column 3, line 27, insert the word --positioned-- between "be" and "utilizing".

In column 4, line 17, delete "36,," and insert therefor --36',--.

In column 4, line 23, delete "36;" and insert therefor --36'--.

In column 4, line 34, delete the word "and" and insert therefor --an--.

Signed and Sealed this

Fourth Day of September, 1990

*Attest:*

HARRY F. MANBECK, JR.

*Attesting Officer*

*Commissioner of Patents and Trademarks*